W. C. EHRENFELD.
TUBE CONNECTING AND VULCANIZING MEANS.
APPLICATION FILED FEB. 17, 1919.
1,314,256.
Patented Aug. 26, 1919.
3 SHEETS—SHEET 3.
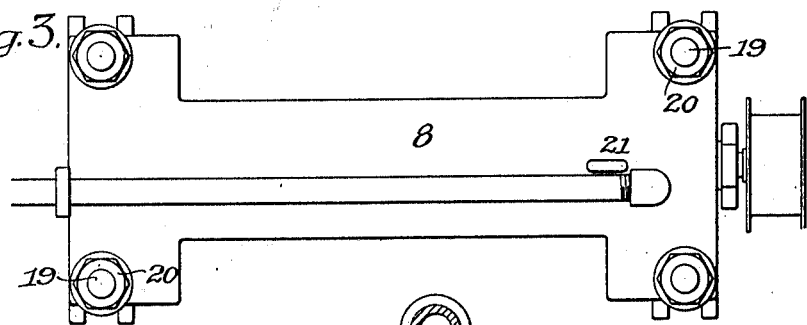
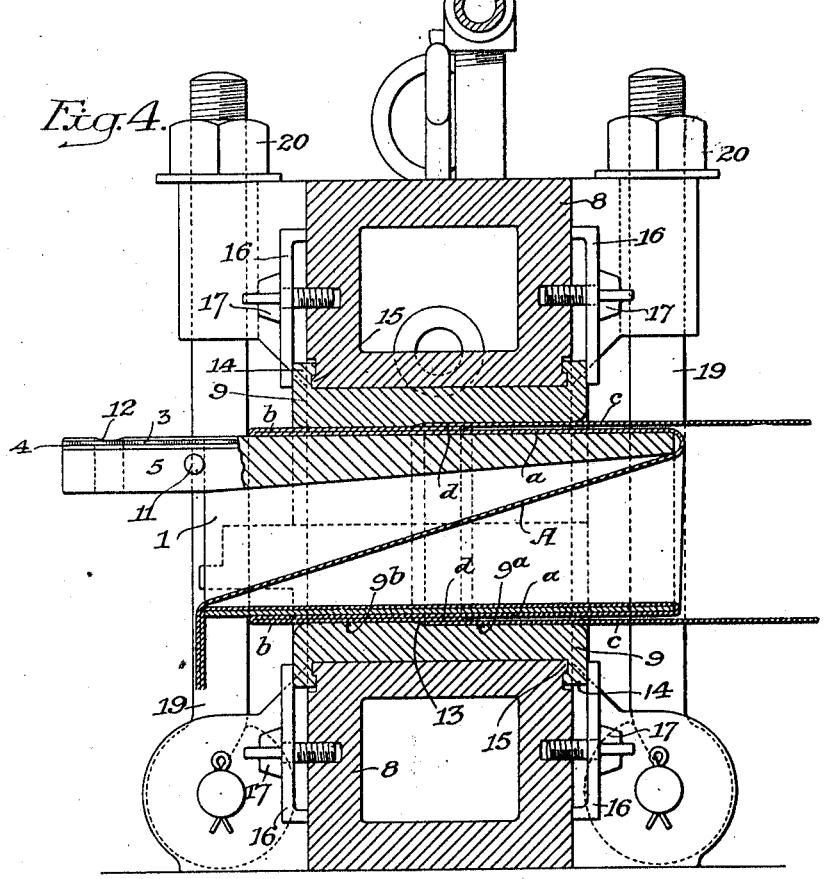
Inventor;
William C. Ehrenfeld,
by his Attorneys.
Howson & Howson

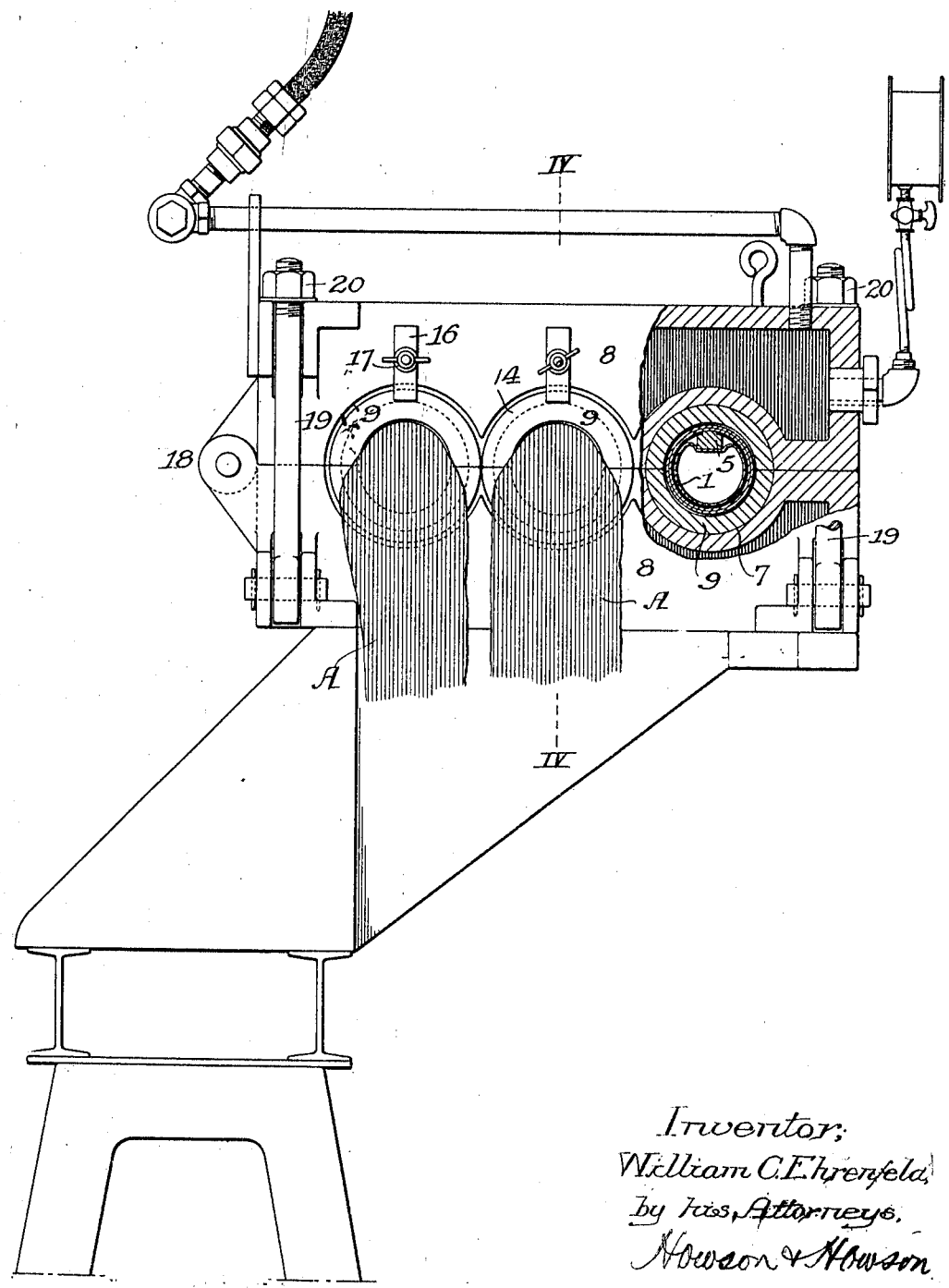

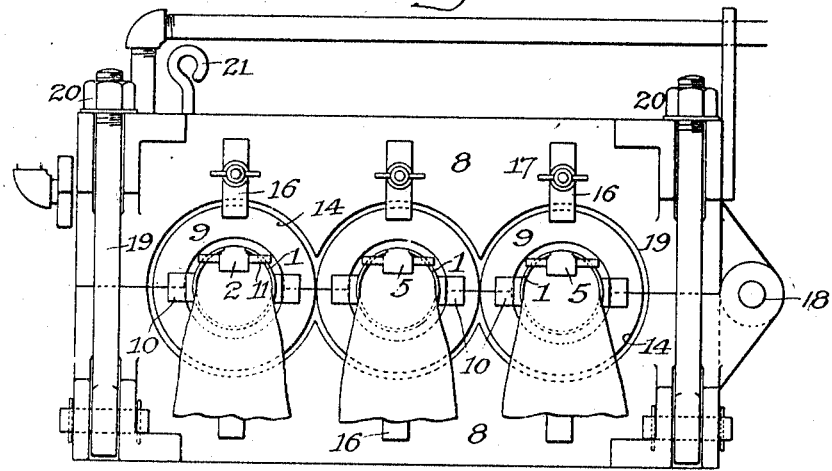
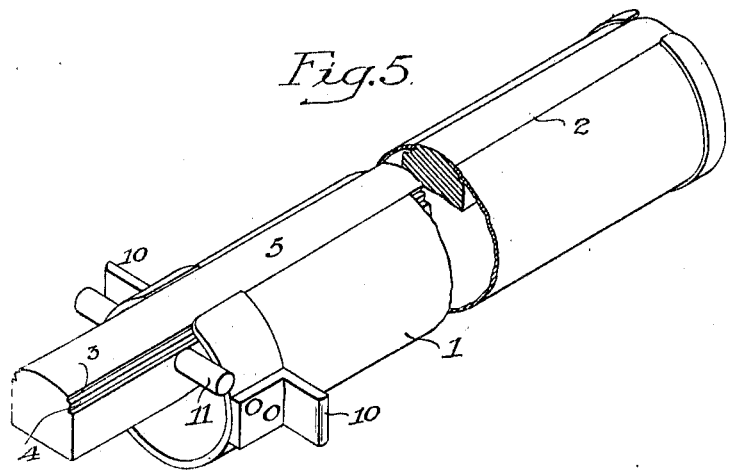

UNITED STATES PATENT OFFICE.

WILLIAM C. EHRENFELD, OF FLEMINGTON, NEW JERSEY.

TUBE CONNECTING AND VULCANIZING MEANS.

1,314,256.  Specification of Letters Patent.  Patented Aug. 26, 1919.

Application filed February 17, 1919. Serial No. 277,467.

*To all whom it may concern:*

Be it known that I, WILLIAM C. EHRENFELD, a citizen of the United States, residing in Flemington, Hunterdon county, New Jersey, have invented certain Improvements in Tube Connecting and Vulcanizing Means, of which the following is a specification.

My invention relates to mechanism for splicing, or connecting into continuous lengths, the inner tubes of automobile tires, and the object of my invention is to provide improved mandrel construction over which the end of the tube can be placed; to provide an improved form of vulcanizing structure, and to provide improved accessories therefor; all of which features and other details of my invention will more fully appear hereinafter, reference being had to the accompanying drawings, in which:

Figure 1, is a side elevation, partly in section, of a vulcanizing structure made in accordance with my invention, such view also showing details of construction forming the subject of my invention.

Fig. 2, is a view of the opposite side of the structure shown in Fig. 1.

Fig. 3, is a plan view of the structure.

Fig. 4, is an enlarged sectional elevation on the line IV—IV, Fig. 1, and

Fig. 5, is a perspective view of the improved mandrel.

As is well known, the inner continuous tubes of automobile tires are made from rubber tubing cut to the desired lengths; the open ends of which must be joined to form the continuous tubular structure. In practice, such lengths are straight in some instances, and in other instances they are curved approximately to the contour that the continuous tubes will assume when disposed in the shoe or casing of an automobile tire. The ends of the tubular lengths must be joined to form a continuous tube, and in carrying out my invention this joining of the ends may be effected in the following manner:

I provide a hollow mandrel 1, the wall of which has a tapering slot 2, with the edges of said slot preferably cut off square; that is to say, on radial lines, and these edges are intended to fit the dovetailed sides 3 of recesses 4 formed in a wedging member 5 which is adapted to enter said slot and spread the walls of said mandrel.

The tubular section A to be joined is introduced into this mandrel and then one end of the same is drawn over the end of the mandrel, as clearly illustrated in Fig. 4, at *a;* being returned upon itself, as indicated at *b.* The opposite end *c* of the tube is now stretched over the mandrel and over the opposite doubled end *b* of the tube thereon, to the desired extent of the lap, as indicated at *d.*

The mandrel structure so prepared is then set within half round sockets or recesses 7 of a steam heated vulcanizing chest 8 which, when closed together form circular passages, and by preference the half sections of a liner or reducing shell 9 (which may vary in size to accommodate different-sized tubes) are placed within the sockets or recesses 7, so that various sizes of mandrels can be accommodated; such reducing shell being interposed between the lapped ends of the tube carried by the mandrel and the walls of the recess 7 in the steam chest; as clearly shown in Fig. 4.

The mandrel may then be expanded by driving in the wedge 5 so as to insure close contact of the wall of the mandrel and the wall of the reducing shell with the layers of rubber to be joined, and then steam to the desired extent may be introduced into the vulcanizing chest 8, and the heat will have the effect of vulcanizing the lapped ends of the rubber, thereby finishing the joint and transforming the tubular section into a continuous inner tube for a tire.

The mandrel may be provided with ears 10 which limit its inward movement with respect to the recess 7 of the steam chest, or the reducing shell 9, and the wedge may be provided with a cross pin 11 to limit its movement with respect to the mandrel and with an aperture 12 for the attachment of a hook or other device to facilitate its removal. After the vulcanizing of the tube is effected, the wedge is separated from the mandrel, the latter is removed from the mold, and then the finished tube can be withdrawn from the mandrel through its slot 2.

To accommodate the lapping portion of the tube, the recesses 7 of the steam chest, or the reducing sleeves or shells 9 fitting the same, may have an internal wall of two diameters, those of the reducing shell being indicated at 9ᵃ and 9ᵇ, with a sloping portion 13 between the same adapted to lie adjacent the end of the outer lap of the tube indicated at *d* and finish the lap with a beveled edge.

The steam chest is provided with the usual pipe connections whereby steam may be introduced therein, with steam hose attachments making the structure substantially flexible. A suitable form of thermometer may be carried by the vulcanizing chest together with a steam gage to insure maintenance of the desired heat and pressure, and any suitable form of exhaust or drain for the water of condensation may be provided.

The reducing sleeves or shells 9, of course, are in half sections, and they may be provided with flanged ends 14 adapted to fit over shoulders 15 carried by the steam chest at the ends of the sockets 7; said liners being rotatable with respect to the steam chest sections when fitted into place. In order that they may be securely held in proper position with respect to the steam chest, the latter may be provided with detachable ears or clips 16 for engagement with said reducing sleeves, which clips may be held in place by thumb screws 17. When in the operative position, the sections of the steam vulcanizing chest, which may be hinged at the point 18, may be held together by bolts 19 and nuts 20, and to raise the same a suitable counterbalance attached to a rope, chain or the like, (not shown) may be employed; one end of such rope or chain being attachable to a hook or eye 21 carried by the upper section of the steam chest.

I claim:

1. In a device for joining the ends of a tubular section, the combination of a sectional heating structure having a pair of registering recesses, an expansible tubular mandrel adapted to receive the ends of a tube and with the same occupy the space formed by said registering recesses; the ends of the tube to be joined being stretched over said mandrel and the latter having a tapered slot, and a wedge adapted to said slot for spreading said mandrel to confine the meeting ends of the tube within the registering recesses; the surface of said wedge being continuous with the surface of the mandrel whereby a completely cylindrical wall is provided for contact with the tube.

2. In a device for joining the ends of a tubular section, the combination of a sectional heating structure having a pair of registering recesses, an expansible tubular mandrel adapted to receive the ends of a tube and with the same occupy the space formed by said registering recesses; the ends of the tube to be joined being stretched over said mandrel and the latter having a tapered slot, and a wedge adapted to said slot for spreading said mandrel; said wedge having dovetailed grooves receiving the wall edges of the mandrel slot and the surface of said wedge being continuous with the surface of the mandrel whereby a completely cylindrical wall is provided for contact with the tube.

3. In a device for joining the ends of a flexible tubular structure, the combination of a sectional heating structure having a pair of registering recesses, an expansible tubular mandrel having a tapered slot adapted to receive the ends of said tubular structure, a wedge fitting the slot of said mandrel for spreading the wall of the same, and sectional liners mounted in said registering recesses for receiving the mandrel; the surface of said wedge being continuous with the surface of the mandrel whereby a completely cylindrical wall is provided for contact with the tube.

4. In a device for joining the ends of a flexible tubular structure, the combination of a sectional heating structure having a pair of registering recesses, an expansible tubular mandrel having a tapered slot adapted to receive the ends of a tubular structure, a wedge fitting the slot of said mandrel for spreading the same; said wedge having dovetailed grooves receiving the wall edges of the mandrel slot and having a surface continuous with the surface of the mandrel whereby a completely cylindrical wall is provided for contact with the tube, sectional liners mounted in said recesses for receiving the mandrel, and means for holding said sectional liners in place.

5. In a device for joining the ends of a flexible tubular structure, the combination of a sectional heating structure having a pair of registering recesses, an expansible tubular mandrel adapted to receive the ends of a tubular structure; said mandrel being slotted from end to end, a wedge adapted to said slot for spreading said mandrel; the surface of said wedge being continuous with the surface of the mandrel whereby a completely cylindrical wall is provided for contact with the tube when the wedge occupies the slot of the mandrel, sectional liners mounted in said registering recesses for receiving the mandrel; said liners having flanged ends fitting over shoulders formed at the ends of the recesses, and means for holding said sectional liners in place.

6. In a device for joining the ends of a flexible tubular structure, the combination of a sectional heating structure having registering recesses, an expansible mandrel adapted to receive the ends of a tubular structure, a wedge for spreading said mandrel, sectional liners mounted in said registering recesses for receiving the mandrel, and means for holding said sectional liners in place; said liners being of two diameters internally and having a beveled surface portion connecting the surfaces of the internal walls of two diameters.

7. In a device for joining the lapping ends of a rubber tube, the combination of a pair of sectional heating chests hinged together and having a pair of registering recesses, means for locking said heating chests together, an expansible mandrel having a tapered slot adapted to receive the lapped ends of a tube and occupy the space formed by said registering recesses, a wedge for spreading said mandrel; said wedge having dovetailed grooves receiving the wall edges of the mandrel slot, and means for limiting the endwise movement of the wedge with respect to the mandrel; the surface of said wedge being continuous with the surface of the mandrel whereby a completely cylindrical wall is provided for contact with the tube.

8. In a device for joining the lapping ends of a rubber tube, the combination of a pair of sectional heating chests hinged together and having a pair of registering recesses, means for locking said heating chests together, an expansible tubular mandrel adapted to receive the lapped ends of a tube and occupy the space formed by said registering recesses; said mandrel having a tapered slot, a wedge for spreading said mandrel; the surface of said wedge being continuous with the surface of the mandrel whereby a completely cylindrical wall is provided for contact with the tube, means carried by the mandrel for limiting endwise movement of the same with respect to the heating chests, and means carried by the wedge for limiting endwise movement of the same with respect to the mandrel.

9. In a device for joining the ends of a rubber tube, the combination of a pair of sectional heating chests hinged together and held in contact with each other; said chests having registering recesses, an expansible mandrel having a tapered slot adapted to receive the lapped ends of a tube, a wedge for spreading said mandrel, and sectional liners mounted in said registering recesses and receiving said tube-covered mandrel; said sectional liners being of two diameters internally and having a beveled portion connecting the internal walls of two diameters; the space between the same and the mandrel being occupied by the tube.

10. In a device for joining the ends of a rubber tube, the combination of a pair of sectional heating chests hinged together, means including hinged bolts for holding the same in contact with each other; said chests having registering recesses, means for heating said chests, an expansible mandrel having a tapered slot adapted to receive the lapped ends of a tube, a wedge for spreading said mandrel, liners mounted in said registering recesses and receiving said mandrel; said liners being of two diameters internally and having a beveled portion connecting the internal walls of two diameters, means for locking the liners to the heating chests, and independent means for holding said liners in proper position.

11. In a device for joining the ends of a tubular section, the combination of a sectional heating structure having a pair of registering recesses, an expansible tubular mandrel adapted to receive the lapped ends of a tube and with the same occupy the space formed by said registering recesses; the ends of the tube to be joined being stretched over said mandrel and the latter having a tapered slot, and a wedge adapted to said slot for spreading said mandrel to confine the meeting ends of the tube between the same and the walls of the registering recesses; the outer surface of said wedge being continuous with the outer surface of the mandrel whereby a completely cylindrical wall is provided for contact with the tube.

12. In a device for joining the ends of a flexible tubular structure, the combination of a sectional heating structure having a pair of registering recesses, an expansible tubular mandrel adapted to receive the ends of said tubular structure and having a tapered slot, a wedge fitting the slot of said mandrel for spreading the wall of the same; the wedge having dovetailed grooves receiving the wall edges of the mandrel slot, and sectional liners mounted in said registering recesses for receiving the mandrel and the tube carried by the same; the outer surface of said wedge being continuous with the outer surface of the mandrel whereby a completely cylindrical wall is provided for contact with the tube.

13. In a device for joining the ends of a flexible tubular structure, the combination of a sectional heating structure having a pair of registering recesses, a tubular mandrel over which the meeting ends of said tubular structure are stretched; said mandrel being expansible and being slotted from end to end, and a wedge fitting the slot of said mandrel for spreading the wall of the same to tightly confine the meeting edges of the tube between said mandrel and the walls of the registering recesses; the outer surface of said wedge being curved on the same arc as the curvature of the mandrel whereby a completely cylindrical wall is provided for contact with the tube when the wedge occupies the slot of the mandrel.

14. In a device for joining the ends of a flexible tubular structure, the combination of a sectional heating structure having a pair of registering recesses, removable liners detachably connected to said heating structure in the registering recesses thereof; said liners providing for operation upon tubes of differing diameter, a tubular mandrel over which the meeting ends of said tubular structure are stretched; said mandrel being expansible and being slotted from end to end, and a wedge fitting the slot of said mandrel for spreading the wall of the same to tightly confine the meeting edges of the tube between said mandrel and the walls of the detachable liners; the outer surface of said wedge being curved on the same arc as the curvature of the mandrel whereby a completely cylindrical wall is provided for contact with the tube when the wedge occupies the slot of the mandrel.

WILLIAM C. EHRENFELD.